Aug. 20, 1940.   M. LACHARITÉ ET AL   2,212,321
DEVICE FOR MULTIPLYING THE ROTATION OF A SHAFT
Filed Feb. 26, 1940   2 Sheets-Sheet 1

INVENTORS
Maurice Lacharité
Louis Marie Samy

INVENTORS

Patented Aug. 20, 1940

2,212,321

UNITED STATES PATENT OFFICE 2,212,321

DEVICE FOR MULTIPLYING THE ROTATION OF A SHAFT

Maurice Lacharité and Louis Marie Sauvé, Ville, Lasalle, Quebec, Canada

Application February 26, 1940, Serial No. 320,864

1 Claim. (Cl. 74—305)

The present invention relates to improvements in a device principally adapted to increase the rotating speed of a driving shaft or spindle, said device being adaptable to automobiles, aeroplanes and all such machines in which high speeds are required.

This device has for its main object to multiply the rotations of a shaft or spindle, or, if desired, reduce the consumption of fuel required to operate said shaft at its normal rate of speed. It is particularly compact, easily adapted and of simple construction.

It consists broadly of a stationary open end casing provided with a fixed crown gear and through said casing is journalled a driving shaft upon which is fixedly mounted a driving disc carrying a number of loosely mounted intermediate gears adapted to mesh with said crown gear. The open end of said casing it closed by a disc wheel loosely mounted adjacent the end of said driving shaft, said disc having an outward projecting spindle on one side thereof and on its other side a fixed sprocket gear adapted to engage the intermediate gears mounted upon the driving disc. Upon the projecting spindle may be mounted a driving gear, or pulley adapted to actuate any suitable device, or in the case of an aeroplane, the propeller may be adjusted thereon by any convenient means.

In the drawings.

Like numerals of reference indicate corresponding parts in each figure.

Figure 1:
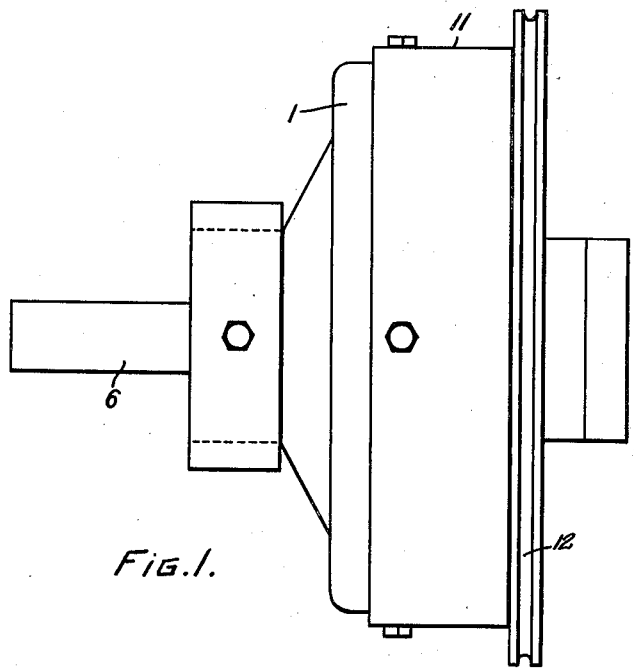
Figure 1 is a side elevation view of one preferred form of the device according to the invention.
Figure 2:
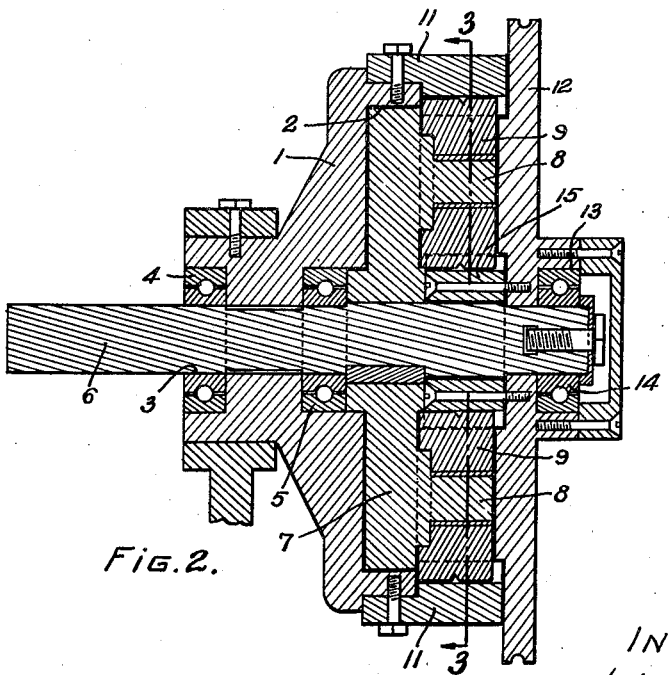
Figure 2 is a vertical section through Figure 1.
Figure 3:
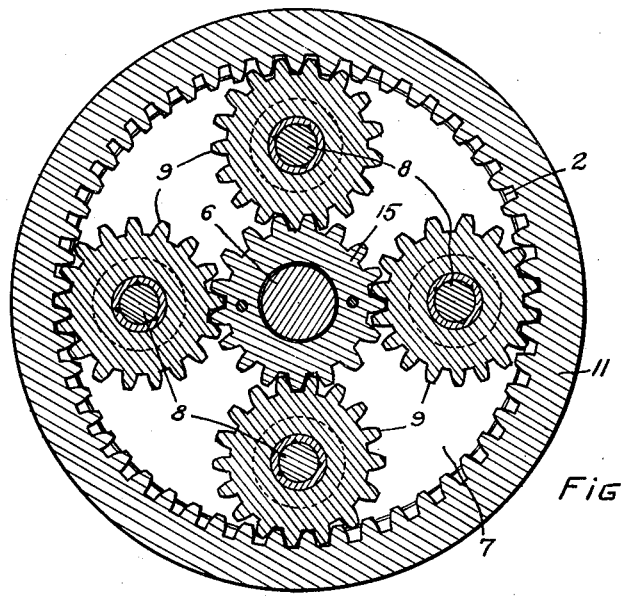
Figure 3 is a cross section on line 3—3 of Figure 2.
Figure 4:
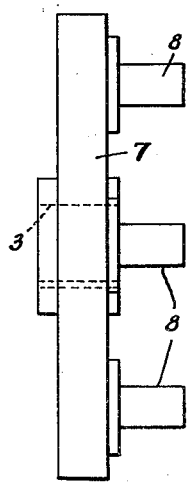
Figure 4 is a detail side elevation view of the disc carrying a plurality of gears (the gears are not shown)
Figure 5:
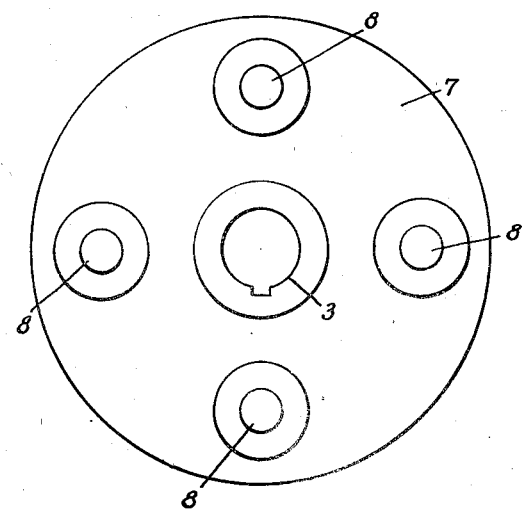
Figure 5 is an end view of Figure 4.

Referring to the drawings, the device consists of a stationary circular casing 1 having a circumferential rib 2 and a centrally disposed hole 3 and ball bearings 4 and 5, and in which is journalled the driving shaft 6. The shaft 6 preferably projects through the hole 3 and is provided with a driving disc wheel 7 fixedly mounted thereon and adapted to rotate within said casing 1. Upon one of the faces of said disc are provided a plurality of radially disposed and suitably distanced projecting stub-shafts 8 upon which are rotatively mounted the intermediate gears 9, each of which are preferably of the same size and adapted to mesh with the crown gear 11 fixedly mounted upon the circumferential rib 2 of the casing.

Adjacent the end of the driving shaft 6 is mounted, parallel to the driving disc and in alignment therewith, the loosely rotating disc wheel 12. Said disc wheel 12 has a recessed hub portion 13 in which may be provided ball bearing 14 and suitable means to retain said disc in operating position. Upon the inner face is fixedly mounted a gear 15 which co-acts with the gears 9. The disc, when in operating position, closes the open end of the casing 1, and upon its circular flange 13 may be secured any suitable means to impart motion to a machine or in the case of an aeroplane, a propeller may be secured directly thereupon.

The gears 9 revolve with the disc wheel 7 and are rotated by means of the crown gear 11 which is fixed to the stationary casing 1, thus imparting motion to the gear 15, and thus multiplying the revolutions of the driving shaft 6. The speed of the said disc 12 is proportional to the size of the gear 15.

Said disc also acts as a fly-wheel, thus reducing the amount of energy required to actuate it. The reduction in the consumption of fuel necessary to operate this device is proportional also to the speed and power of the engine or motor, as with this device a motor may function at a much reduced speed and still impart its normal speed to the device. It is evident that at the normal speed of the motor, a considerable economy in fuel will result.

It is understood that only a preferred form of the device is herein disclosed and that modifications may be made thereto without departing from the spirit and scope of the present invention.

What we claim as our invention is:

A device of the character described, in combination with the driving shaft of a motor, consisting of a stationary casing in which said driving shaft is journalled, a crown gear fixedly mounted upon said casing, a driving disc disposed and locked upon said driving shaft and located within said stationary casing, said disc carrying a plurality of stub shafts each having a loosely rotating gear mounted thereon, all of said loosely rotating gears meshing with said crown gear, and a disc wheel loosely mounted upon said driving shaft, said disc wheel being of greater diameter and extending adjacent the edge of said crown gear and parallel with said stationary casing, said disc wheel carrying upon its inner face a gear fixedly mounted thereon adapted to co-act with said loosely rotating gears and upon its outer face, a recessed circular flange extending over the end of said driving shaft, and means located within said recessed circular flange adapted to hold said disc wheel loosely thereon, substantially as described.

MAURICE LACHARITÉ.
LOUIS MARIE SAUVÉ.